ABSTRACT OF THE DISCLOSURE

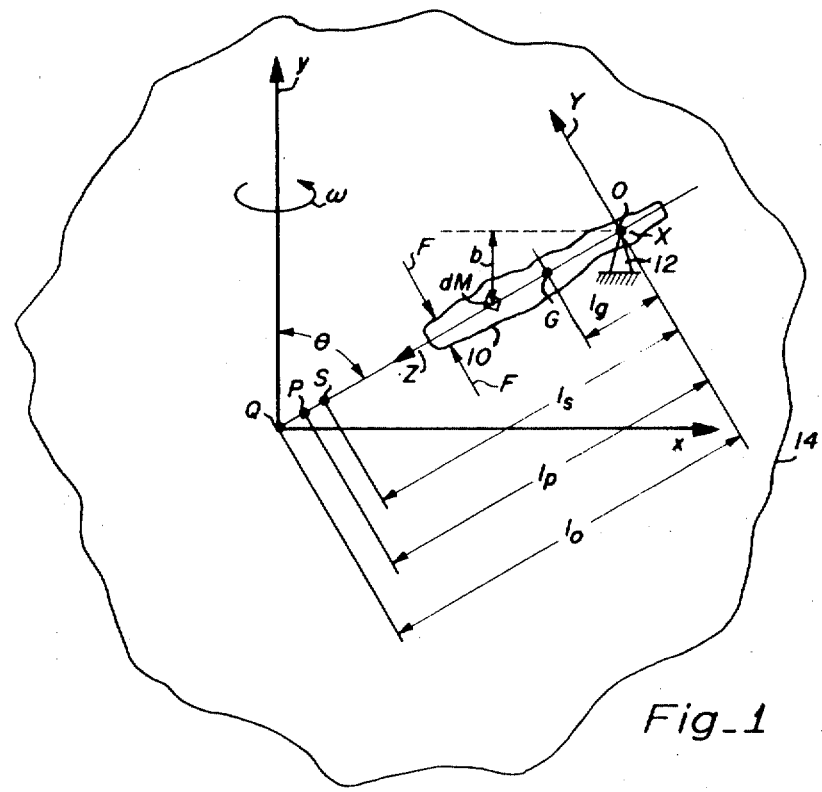
Fig_1
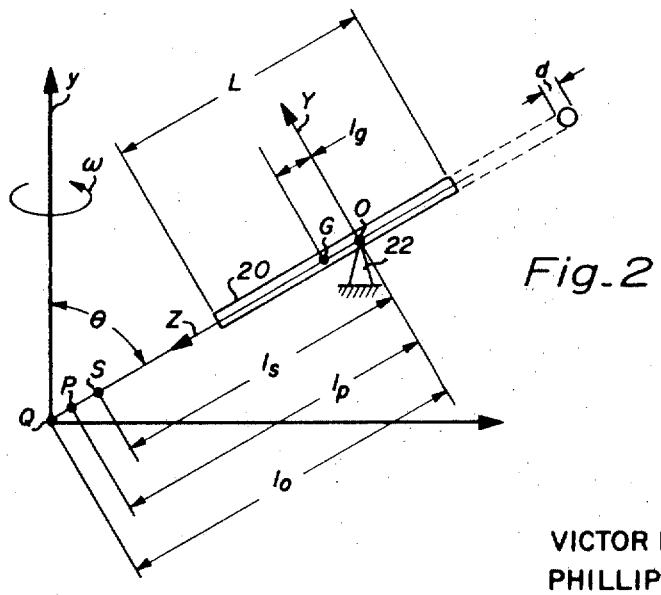
Fig_2
INVENTORS
VICTOR B. COREY
PHILLIP C. LINWICK
ALLAN F. POTTER
BY
ATTORNEY

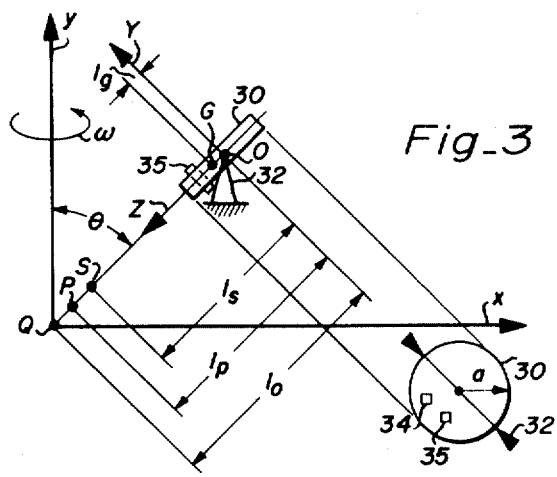
Fig_3
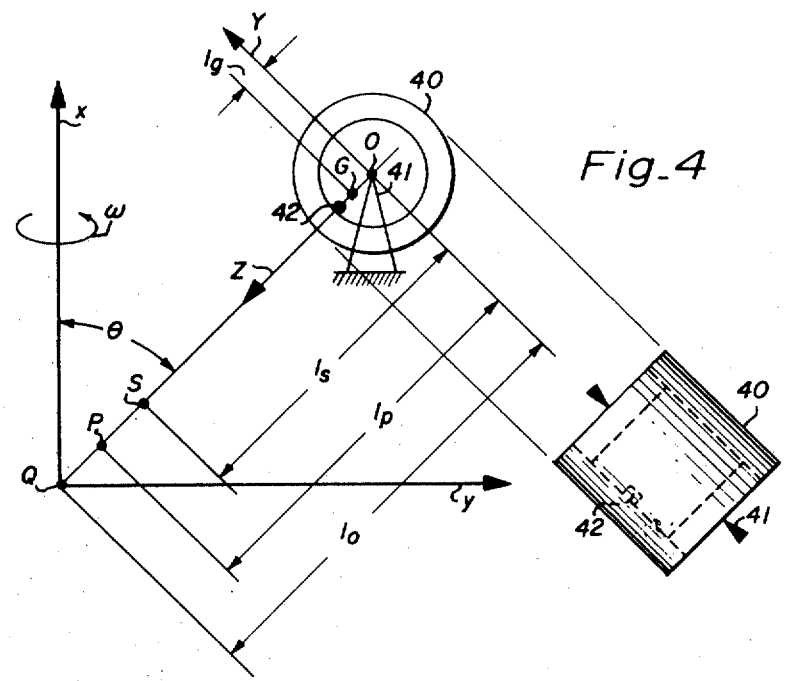
Fig_4
INVENTORS
VICTOR B. COREY
PHILLIP C. LINWICK
ALLAN F. POTTER
ATTORNEY 3,616,698
PENDULOUS ACCELEROMETER
Victor B. Corey and Phillip C. Linwick, Bellevue, and Allan F. Potter, Redmond, Wash., assignors to United Control Corporation, Redmond, Wash.
Filed Apr. 12, 1968, Ser. No. 720,794
Int. Cl. G01p 15/00
U.S. Cl. 73—514                    13 Claims

A pendulous accelerometer having a pendulum shaped and pivoted such that its center of spin insensitivity and its center of angular acceleration insensitivity substantially coincide. The accelerometer is mounted with its substantially coincident centers of spin and angular acceleration insensitivity to coincide with the center of gravity of an unstabilized vehicle whose linear acceleration it is to measure, and the accelerometer thereby becomes insensitive to any and all angular accelerations and angular velocities of the vehicle about axes passing through the vehicle center of gravity.

BACKGROUND OF THE INVENTION

Field of the invention

This invention relates to the construction of pendulous accelerometers and to the measurement of linear acceleration of an unstabilized platform or vehicular body along a sensitive axis, and more particularly to the configuration of the pendulum of the pendulous accelerometer to make the measurement of acceleration independent of any angular aceceleration and/or angular velocity of the vehicular body. This invention also relates to the method of arranging the accelerometer to measure linear acceleration of the vehicular body along a sensitive body axis such that the measured linear acceleration is independent of the angular acceleration and/or angular velocity of the vehicular body.

Stated differently, this invention addresses itself to the solution of the problem of employing one or more pendulous linear accelerometers to measure the various vector components of the linear acceleration of a vehicular body rotating or accelerating about any axis passing through the center of gravity of the vehicle, without developing spurious output responses related to angular acceleration and/or spin of the vehicle about its center of gravity, which spurious responses must typically be removed from all known conventional measurements by an involved and expensive process of data reduction.

The measurement of acceleration, particularly with the advent of space age vehicles (also referred to as platforms), is becoming increasingly more important. For example, for the design of vehicle frames, as well as the equipment it carries, it is of the utmost importance that accurate knowledge be had of the forces and stresses to which the craft and the equipment it carries are subjected, so that these factors may be taken into account. Also, the accurate measurement of linear acceleration components is important since these components represent convenient measures for evaluating the aerodynamic performance of the vehicular body, which permits comparison among different vehicle configurations with relation to stability, path trajectory and other important criteria.

Such vehicles are usually subjected simultaneously to linear accelerations, angular accelerations and angular velocities, each of which may vary over a wide range, and the complete motion of such a body requires determination of these aspects of motion, separated as to type, magnitude and direction. Heretofore, the determination of the separate types and components of the accelerations of a vehiclular body has been found to be very difficult since the methods of locating and constructing accelerometers resulted in sensitivity to more than one of the accelerations to be measured.

Description of the prior art

In a vehicular body such as a missile, it is desirable to measure the angular accelerations about and the linear accelerations along the pitch, yaw and roll axes, for complex motions of the vehicle about its center of gravity. Heretofore, an accelerometer mounted to the body produced an output which was representative of, say, the linear acceleration along the yaw axis together with the angular acceleration about the roll axis and the angular velocities about both the pitch axis and the yaw axis.

Even though the resultant acceleration can be resolved into the desired component accelerations with the aid of additional accelerometers mounted to the vehicle, such a procedure requires sacrifice of precious vehicle space, decreases the overall reliability of the system, and is costly both as to the number of measuring devices required and as to the data reduction process through which the separated individual acceleration components must be recovered. In addition, such a procedure produces compromised accuracy and limits the range of linear acceleration which can be measured because a generally unpredictable variable portion of the useful range of each linear accelerometer must be allocated to the typical spurious responses of linear accelerometers to angular accelerations and angular velocities of the vehicle, which spurious responses are later subtracted, after the complex data reduction process is completed, to derive the desired linear acceleration components. If the linear acceleration to be determined is small in comparison with the total acceleration to which the accelerometers respond, the measurement accuracy for the linear acceleration to be determined is very poor. And if the range of the spurious accelerations to which the accelerometer must respond is very great, the accelerometer must be constructed with a range to accommodate the sum of all accelerations, thereby increasing its complexity and cost, and further decreasing its accuracy.

One solution proposed heretofore has been to utilize so-called translational accelerometers and to locate the center of mass of such an accelerometer directly on the center of gravity of the vehicle so that the accelerometer is only sensitive to linear acceleration along the selected vehicular axis. For example, if it is desired to measure linear acceleration along the yaw axis, the center of mass of the accelerometer is placed at the intersection of the pitch and roll axes with the linear acceleration sensitive axis of the accelerometer oriented along the yaw axis.

This solution of the problem, however, overlooks the very important practical factor that in many vehicles there is no available space at that particular point to accommodate the accelerometer, or that such placement would be inconvenient; and that, in general, only one such translational accelerometer can be so placed, so that measurements of linear acceleration components in other axes are subjected to the same problems and limitations as were previously stated. The reason is that it is impossible to construct or to locate a translational accelerometer (except on the center of rotation as described above) in such a manner that it will become insensitive to all angular motions about all of the principal vehicle body axes. Accordingly, unless translational accelerometers are located at the intersection of the body axes about which the body rotates, the measured output is proportional to certain angular accelerations and/or angular velocities as well as to the linear acceleration which should be measured.

Another solution proposed heretofore is disclosed in British Pat. No. 972,826, dated Oct. 14, 1964, which describes locating the pendulous accelerometer in such a manner that the pendulum center of percussion coincides with the center of gravity of the vehicular body in which it is mounted. Since it is possible to construct the pendulum such that its center of percussion lies outside the physical pendulum structure, the accelerometer can be mounted a distance from the vehiclular body center of gravity, thereby providing angular acceleration insensitivity.

While the above-disclosed solution does provide angular acceleration insensitivity about any axis passing through the center of gravity of the vehicle, it has been found that this solution of itself does not at all insure angular velocity insensitivity about any axis passing through the center of gravity of the vehicle. In other words, even though mounting the accelerometer so that the pendulum center of percussion coincides with the center of gravity of the vehicular body does prevent errors in the resultant linear acceleration due to angular accelerations of the vehicle, this condition does not obviate the error in the noted acceleration due to angular velocities of the vehicle. As a result, general angular motion of the vehicle about its center of gravity will generate input torques on the pendulum due to angular velocities about skew axes. The spurious accelerometer outputs which result will be combined with the desired response to a component of linear acceleration. Accordingly, the measured accelerometer output is not truly representative of the linear acceleration of the center of gravity of the vehicle along the sensitive axis, but involves erroneous components occasioned by angular velocities of the vehicle. To applicant's knowledge no solution has been proposed which would not only eliminate angular acceleration errors, but also angular velocity errors of pendulous accelerometers.

SUMMARY OF THE INVENTION

It is therefore a primary object of this invention to provide a pendulous accelerometer for the measurement of linear acceleratoion of a vehicular body which is insensitive and non-responsive to any and all angular accelerations and angular velocities of the vehicle about its principal axes.

It is another object of the present invention to provide a method for measuring the linear acceleration of a vehicular body which is independent of the angular acceleration and the angular velocity of the body about any axis passing through a known point.

It is another object of this invention to provide a pendulous accelerometer which is constructed and arranged in such a manner that it provides substantially no output in response to arbitrary angular accelerations and angular velocities about any axis through a selected point.

It is a further object of this invention to utilize a pendulous accelerometer for the measurement of linear acceleration along a sensitive axis of a body subjected to linear and angular acceleration and velocities, and in which no portion of the useful range of the accelerometer is used by the angular acceleration or angular velocity of the body so that the output signal is proportional only to the linear acceleration to be measured.

It is also an object of this invention to provide a pendulous accelerometer and arrange the same in a vehicular body such that the accelerometer performs in a manner of a point mass linear accelerometer located at the intersection of the three principal body axes.

It is still another object of this invention to provide a pendulous accelerometer for mounting in a vehicle which is subject to linear acceleration along a designated body axis parallel to the axis of linear acceleration sensitivity of the accelerometer, and which is further subject to angular acceleration and angular velocities about other axes through the vehicle center of gravity, and shaping and pivoting the pendulous mass in such a manner that the pendulous accelerometer behaves like a linear point mass accelerometer with the center of mass located at the vehicle center of gravity.

It is still a further object of this invention to provide a method of construction of a pendulous accelerometer which is insensitive to angular acceleration and velocity about any axis passing through the desired point of insensitivity.

It is still a further object of this invention to construct an accelerometer including a pendulum having its center of spin insensitivity and its center of percussion located a distance from the physical confines of the pendulous accelerometer and in which these two centers either coincide or are very closely spaced to one another.

Briefly, the pendulum of the pendulous accelerometer is shaped and pivoted in such a manner that its moment of inertia about its axis of suspension is substantially equal to the difference between the moments of inertia about two axes which are perpendicular to the axis of suspension and to one another, have a common point of intersection and having one of the two axes passing through the pendulum center of gravity. The center of spin insensitivity and the center of percussion of the pendulum essentially coincide, and the pendulous accelerometer may be mounted in the vehicle in such a manner that the nearly coincident centers of spin and percussion also coincide with the center of gravity of the vehicle, the sensitive axis being perpendicular to both the axes of suspension and the pendulum axis passing through its center of mass.

Further objects and advantages of the present invention will become apparent to those skilled in the art to which the invention pertains as the ensuing description proceeds.

The features of novelty that are considered characteristic of this invention are set forth with particularity in the appended claims. The organization and method of operation of the invention itself wll best be understood from the followng description when read in connection with the accompanying drawings in which:

BRIEF DESCRIPTION OF THE DRAWINGS

FIG. 1 is a diagram illustrating a vehicle and a pendulum, a vehicle coordinate system and a pendulum coordinate system;

FIG. 2 is an illustrative view of a slender rod pendulum;

FIG. 3 is an illustrative view of a circular disc pendulum; and

FIG. 4 is an illustrative view of a circular cylindrical pendulum.

DESCRIPTION OF THE PREFERRED EMBODIMENT

Referring now to FIG. 1, there is shown a pendulous mass 10 of arbitrary shape which is pivoted at 12 for rotation about an axis of suspension which is also designated as the X-axis and which is fixed with respect to a platform 14 which is also referred to as a vehicular body. The suspension axis extends perpendicularly to the plane of the paper.

Point G within body 10 defines the pendulum center of gravity and is located a distance $l_g$ from the axis of suspension along an axis which is perpendicular to the suspension axis and which will be referred to interchangeably as the Z-axis or the extension axis. To complete the picture, there is a Y-axis which is defined as the axis perpendicular to the X-axis and the Z-axis and intersecting these axes at a common point O. Accordingly, point O is the center of a coordinate system of the X, Y and Z axes fixed in the pendulum 10. The direction of the Y-axis will also be referred to as the sensitivity direction since it is the direction along which the accelerometer measures linear acceleration.

If pendulous mass 10 were mounted such that its center of gravity G coincided with the center of gravity Q of unstabilized platform 14, then the accelerometer would truly measure the linear acceleration of platform 14 along the sensitive direction, i.e., along the Y-axis.

However, the forces acting on pendulum 10, in addition to the linear acceleration along the sensitive direction, are those due to the angular acceleration and angular velocity of platform 14 about axes passing through its center of gravity Q. More correctly stated, angular acceleration and angular velocity of the platform about axes passing through the platform center of gravity Q produce unbalanced torques on pendulum 10 about the axis of suspension. These torques will henceforth be referred to as the angular acceleration torque and the angular velocity torque, the former being due to angular acceleration and the latter one being due to rotation of the platform. The acceleration is actually measured by determining the force $f$, perpendicular to the Z-axis, necessary to maintain the direction of extension of the pendulum 10 parallel to the Z-axis as is well-known.

As disclosed in British Pat. No. 972,826, there exists along the Z-axis of every pendulum a point P which is defined such that angular acceleration about any axis passing through point P exerts no unbalanced torque on the pendulum about the suspension axis. Point P is known as the center of percussion, and is located a distance $l_p$ from the axis of suspension along the Z-axis of the pendulum. The distance of the center of percussion is given by the equation:

$$l_p = \frac{I_X}{Ml_g} = \frac{k^2_X}{l_g} \quad (1)$$

where $I_X$ is the moment of inertia of the pendulum about the suspension axis, M is the mass of the pendulum, $k_X$ is the radius of gyration of the pendulum about the suspension axes, and $l_g$ is the distance between the axis of suspension (point O) and the center of gravity (point G).

In accordance with Equation 1, a pendulum can always be mounted on a platform in such a manner that its center of percussion coincides with the platform center of gravity, thereby making the accelerometer insensitive to angular acceleration errors. Equation 1 provides the means either for determining the distance $l_p$ for a given pendulum shape, or for changing the shape of the pendulum shape for a given distance $l_p$. Accordingly, there are several ways of satisfying the condition eliminating angular acceleration errors, but, as will now be shown, the shape of the pendulum is susceptible for angular velocity errors which are not eliminated by satisfying Equation 1. In other words, changing the moment of inertia $I_X$ of the pendulum to satisfy Equation 1 may increase or decrease the angular velocity error of the pendulum.

Referring again to FIG. 1, it will now be shown that angular velocities of the platform about any platform axis cause unbalanced torques to be exerted on the pendulum about the suspension axes, and that there is one and only one point, located along the Z-axis, through which an axis may be passed about which rotation produces no torque. This point will be referred to as the center of spin, is designated as S, and is located a distance $l_s$ from the axis of suspension along the Z-axis.

To show this, let the center of gravity Q of the platform be the origin of another coordinate system fixed in platform 14, and let the axes of the platform coordinate system be x-axis, and y-axis and the z-axis. Further, assume that pendulum 10 is arranged such that the Z-axis passes through the origin of both coordinate systems. The torque produced on pendulum 10 about the axis of suspension, when platform 14 is rotated at a constant angular velocity $\omega$ about the y-axis, can be shown to be given by the expression:

$$T = \int\int\int (x\omega^2 b)dM$$

$$= \frac{1}{2}M\omega^2 \sin 2\theta \left[\frac{I_Y - I_Z}{M} - l_o l_g\right] + \omega^2 I_{YZ} \cos 2\theta \quad (2)$$

where $dM$ is an elemental piece of pendulous mass, T is the angular velocity torque about the pendulum suspension axis X, $\omega$ is the angular velocity of platform 14 about the y-axis, $x$ is the distance along the x-axis to elemental piece $dM$, $b$ is the perpendicular distance from the suspension axis to elemental piece $dM$ (i.e., the moment arm of the centrifugal force), $I_Y$ and $I_Z$ are respectively the moments of inertia of the pendulum about the Y and Z-axes, M is the mass of the pendulum, $l_g$ is the distance between the pendulum suspension axis and the pendulum center of gravity C, $l_o$ is the distance between the pendulum axis of suspension and the platform center of gravity Q, and $I_{YZ}$ is a product of inertia. The term $I_{YZ}$ is zero in case of symmetry of the pendulous mass with respect to the XZ plane, and it can be seen that the velocity torque T is greatest for $\theta = 45°$.

Assuming symmetry so that the last term of Equation 2 may be ignored, the angular velocity torque T will be zero only if:

$$\frac{I_Y - I_Z}{M} = l_o l_g \quad (3)$$

The distance $l_o$ between the axis of suspension of the pendulum and the center of gravity Q of the platform at which the angular velocity torque is zero has been previously defined as $l_s$. Accordingly, from Equation 3:

$$l_s = \frac{I_Y - I_Z}{l_g M} \quad (4)$$

Comparing Equation 1 with Equation 4, it is immediately seen that the center of percussion, located a distance $l_p$ from point 0, and the center of spin insensitivity, located a distance $l_s$ from point O, do not necessarily coincide. From this it follows that the pendulum will generally be subjected either to angular acceleration errors or angular velocity errors, or both. Only if $l_s$ and $l_p$ are equal to $l_o$, that is, if the pendulum is constructed such that its center of spin and center of percussion coincide, and are located for coincidence with the center of gravity of the vehicle, is the pendulum free from angular velocity and angular acceleration errors.

The pendulum configuration for coincidence of the center of spin and the center of percussion is obtained by equating Equation 1 to Equation 4:

$$I_X = I_Y - I_Z \quad (5)$$

Any pendulum constructed to satisfy Equation 5 will have coincident centers of spin and percussion and can be mounted such that it will be insensitive to angular velocity and angular acceleration.

While it is desirable that pendulums constructed in accordance with the present invention satisfy Equation 5, it should be understood that this may not always be possible. For example, for a pendulum to satisfy Equation 5 requires that its thickness in the direction of the Y-axis must be zero. Of course, this is not a practical solution, but the thickness may be selected as thin as is consistent with structural integrity. Such a thickness will introduce an insignificant error torque.

For all practical purposes it has been found that a pendulum shaped such that the actual distance between the center of spin and the center of percussion is less than a few feet percent of $l_g$ or $l_s$ is entirely acceptable. Accordingly:

$$l_p - l_s < 0.02 l_p \quad (6)$$

result in entirely acceptable structures.

There are a large number of pendulum configurations which readily satisfy Equation 6 and which approximate Equation 5 to a substantial degree. By way of illustration, but not by way of limitation, a number of pendulum configurations will now be illustrated together with a discussion of how these configurations can be further optimized and with calculations showing the position of the center of spin and percussion, their spacing and the errors resulting therefrom. In connection with such presentation, the nomenclature and conventions previously adopted and used in connection with the description of FIG. 1 will be used.

(a) Slender rod pendulum

Referring now to FIG. 2 of the drawing, there is shown a pendulum in the form of a slender rod 20 which is pivoted near one of its ends at 22. The overall length of the rod is L, and its diameter is d.

It is immediately evident by inspection that the rod's moment of inertia about the X-axis is equal to its moment of inertia of the rod about the Y-axis. Accordingly, to satisfy Equation 5 requires that the moment of inertia about the Z-axis be equal to zero. It is relatively simple to approach this condition by making d as small as is consistent with structural integrity of the pendulum. In any case, even for thick rods, Equation 5 is approximated because the moment of inertia about the X-axis and the Y-axis is so very much greater than about the Z-axis.

This can readily be shown by an actual calculation in which it will be assumed that the rod has a diameter equal to $\frac{1}{10}L$ to provide for good structural integrity, and is pivoted $L/10$ from its center of gravity. Accordingly:

$$d = L/10 \text{ and } l_g = L/10$$

It is readily shown that the rod's moment of inertia about the suspension axis is:

$$I_X = \frac{1}{12}ML^2 + \frac{1}{4}M\left(\frac{d}{2}\right)^2 + Ml_g^2$$

$$= \frac{1}{12}ML^2 + \frac{1}{1600}ML^2 + \frac{1}{100}ML^2 = 0.0939\ ML^2$$

And the distance to the center of percussion from Equation 1 is:

$$l_p = \frac{I_X}{Ml_g} = \frac{0.0939 ML^2}{ML/10} = 0.939L$$

Thus, the center of percussion is located 0.939L from the pivot axis and is 0.339L beyond the end of the rod.

Since $I_Y$ is equal to $I_X$ $$I_Y = I_X = 0.0939 ML^2$$

It is also readily shown that the moment of inertia about the extension axis is:

$$I_Z = \frac{1}{2}M\left(\frac{d}{2}\right) = 0.00125 ML^2$$

Then the distance to the center of spin is, from Equation 3

$$l_s = \frac{I_Y - I_Z}{Ml_g} = \frac{(0.0939 - 0.0012)ML^2}{ML/10} = 0.927L$$

This configuration meets the criterion of Equation 6 because $$l_p - l_s = (0.939 - 0.927)L = 0.012L$$
$$0.021_p = 0.019L$$

and $$0.012L < 0.019L$$

(b) Thin circular disc pendulum

Referring now to FIG. 3 of the drawing, there is shown a pendulum in the form of a thin circular disc 30 which is pivoted about a diameter at 32. Further, a pair of small weights 34 and 35 are attached to one side of the disc to move the center of gravity G off the suspension axis. Disc 30 has a diameter a.

Ignoring weights 34 and 35, it is readily seen that the moment of inertia of disc 30 about the X-axis and about the Z-axis are the same, each being the moment of inertia about a diameter. In accordance with Equation 5, therefore, the moment of inertia about the Y-axis, to satisfy this equation, should be equal to the sum of the moments of inertia about the X-axis and the Z-axis. Assuming disc 30 to be thin, this is, of course, true since $I_X$ is equal to $I_Z$ equal to $\frac{1}{2}I_Y$. Accordingly, Equation 5 is satisfied by a thin circular disc pendulum. Assuming a thickness consistent with structural integrity and adding weights 34 and 35 does not have too much effect as will now be shown.

The following calculations refer to an actual pendulum comprised of a circular disc 0.89 inch in diameter and 0.12 inch thick with a number of turns of copper wire wound around the periphery. The center of the disc is hollowed out from one side and provisions for pivoting the pendulum about a diameter are mounted therein. The parameters of interest for this pendulum were determined to be:

Mass = $2.567 \times 10^{-6}$ lb. sec.$^2$/in.
$l_g = 0.0234$ in.
$I_X = 15.62 \times 10^{-8}$ in. lb. sec.$^2$ Thus $$l_p = \frac{I_X}{Ml_g} = \frac{15.62 \times 10^{-8}}{(2.567 \times 10^{-6})(0.0234)} = 2.60 \text{ in.}$$

$I_Y = 35.49 \times 10^{-8}$ in. lb. sec.$^2$
$I_Z = 20.15 \times 10^{-8}$ in. lb. sec.$^2$ Thus $$l_s = \frac{(35.49 - 20.15)}{(2.567 \times 10^{-6})(0.0234)} = 2.55 \text{ in}$$

This configuration also meets the criterion of Equation 6 because $$l_p - l_s = 0.05 \text{ in.}$$
$$0.021_p = 0.052$$

and $$0.050 < 0.052$$

(c) Poor design—Circular cylindrical pendulum

Referring now to FIG. 4 of the drawing, there is shown a pendulum in the form of a right circular cylinder 40, closed at both ends, which is pivoted about its axis 41 and which has a small unbalance weight 42 attached near its periphery. Such a configuration, with a hollow interior to provide for flotation in a damping fluid, is fairly typical of present day pendulous accelerometer design.

For this configuration it is assumed that the hollow float cylinder has outside diameters of 1.0 inch, an outside length of 1.2 inch, an inside diameter of 0.8 inch, and an inside length of 1.0 inch. The cylinder material is aluminum and the unbalance weight is a material having three times the density of aluminum. The unbalance weight has a diameter of 0.2 inch and a length of 0.2 inch, and is located with its center of gravity 0.4 inch from the pivot axis. For this arrangement it can be shown that:

$M = 1.41 \times 10^{-4}$ lb. sec.$^2$/in.
$l_g = 0.0135$ in.
$Ml_g = 0.019 \times 10^{-4}$ lb. sec.$^2$ and neglecting the inertia of the unbalance weight about its center of gravity, which is very small, $I_X = 0.265 \times 10^{-4}$ in. lb. sec.$^2$ or 30 gm. cm.$^2$
$I_Y = 0.287 \times 10^{-4}$ in. lb. sec.$^2$ or 32 gm. cm.$^2$
$I_Z = 0.279 \times 10^{-4}$ in. lb. sec.$^2$ or 31 gm. cm.$^2$ For these values $$l_p = \frac{I_X}{Ml_g} = \frac{0.265 \times 10^{-4}}{0.019 \times 10^{-4}} = 14 \text{ in.}$$

$$l_s = \frac{I_Y - I_Z}{Ml_g} = \frac{0.0076 \times 10^{-4}}{0.019 \times 10^{-4}} = 0.4 \text{ in}$$

It can be seen that the criterion of Equation 6 is far from satisfied and that large errors due to either angular velocity or angular acceleration are to be expected depending upon the location of the spin axis with respect to P or S.

Conclusions

It has been shown in the three examples just discussed that it is possible to determine the center of spin insensitivity as well as the center of angular acceleration insensitivity or the center of percussion. In addition it has been shown that the mass distribution of the pendulum is of critical concern in attempting to establish these two points close to one another so as to minimize errors due to angular acceleration or angular velocity.

To illustrate the errors that would be experienced due to angular velocities a comparison of Examples 2 and 3 will be made. If both pendulums are mounted in a vehicle in such a manner that the center of percussion P be at the center of gravity Q of the vehicle and the vehicle moves about its center of gravity such that $\theta=45°$ and $\omega=300$ r.p.m., then an output signal will be registered by each accelerometer pendulum since $l_p \neq l_s$. This output signal will be calculated from Equation 2 neglecting the last term because of symmetry and setting $l_o=l_p$. Thus, $$T\omega = \frac{1}{2}M\omega^2 \sin 2\theta \left[\frac{I_Y - I_Z}{M} - l_p l_g\right] \quad (7)$$

For Example 2 it can be shown that $T_\omega = 1.66$ dyne cm.
$T_g = 26.0$ dyne cm./g.

where $T_\omega$ is the error torque due to the angular velocity and is computed from Equation 7, and $T_g$ is the torque produced by $l_g$ of linear acceleration in the sensitive axis Y (shown here for purposes of comparison). Therefore, the error due to the imposed angular velocity is $$E = \frac{1.66}{26.0}g = 0.064g$$

For Example 3 it can be shown that $T_\omega = 13,900$ dyne cm.
$T_g = 832$ dyne cm./g.

and $$E = \frac{13,900}{832}g = 16.7g$$

Obviously, the pendulum design of Example 3 is poorly suited for the application described, whereas the pendulum of Example 2 which was designed to make $I_X$ nearly equal to $(I_Y - I_Z)$ is well suited to make linear acceleration measurements with minimum errors due to angular velocity effects.

In designing a pendulum for a specific application one must known approximately the values of angular velocity and angular acceleration to be expected in that application, and then knowing the acceptable level of errors from these sources one can adjust the geometry of the pendulum to place P and S in proper relation to one another and the axes of rotation. In general, the design effort to minimize such errors reduces to that of making the pendulum as thin as possible consistent with the requirement for structural integrity.

There has been described herein a pendulous accelerometer having a pendulum which is shaped and pivoted such that its center of spin and its center of percussion either coincide or are very close together. When constructed in such a manner, the pendulous accelerometer may be mounted upon a platform such that its center of percussion coincides with the center of gravity of the platform. If so mounted, the accelerometer is insensitive to angular acceleration and angular velocity effects of the platform which is claimed as:

1. A pendulous accelerometer for the measurement of linear acceleration along a sensitivity axis in which a rigid pendulum is pivoted for rotation about a suspension axis which is substantially perpendicular to the sensitivity axis, the improvement in the pendulum consisting of: a pendulum shape and a location of the suspension axis such that the moment of inertia of the pendulum about the suspension axis is substantially equal to the difference between the two separate moments of inertia of the pendulum about a Y-axis and a Z-axis respectively, the Z-axis being defined as the axis passing through the center of gravity of the pendulum and intersecting the suspension axis at right angles, and the Y-axis being defined as the axis passing through the point of intersection of the suspension axis and the Z-axis and being perpendicular to both.

2. A pendulous accelerometer in accordance with claim 1 in which the difference between the moments of inertia of the pendulum about the Y-axis and the Z-axis does not differ by more than 2% from the moment of inertia of the pendulum about the suspension axis.

3. A pendulous accelerometer in accordance with claim 1 in which the pendulum has a thickness parallel to the Y-axis which is as thin as is consistent with structural rigidity.

4. A pendulous accelerometer for the measurement of linear acceleration along a sensitivity axis in which a pendulum is pivoted for rotation about a suspension axis which is substantially perpendicular to the sensitivity axis, the improvement in the pendulum comprising: a pendulum shape and a location of the suspension axis such that the center of percussion and the center of spin of the pendulum substantially coincide and lie outside the physical confines of the pendulum.

5. A pendulous accelerometer in accordance with claim 4 in which the difference between the distance from the axis of suspension to the center of percussion and the center of spin is less than 2% of either of these distances.

6. A pendulous accelerometer for the measurement of linear acceleration along a sensitivity axis in which a pendulum is pivoted for rotation about a suspension axis which is substantially perpendicular to the sensivity axis, the improvement in the pendulum comprising: a pendulum shape and a location of the suspension axis such that it is substantially symmetric about a Z-axis, that its moment of inertia about the Z-axis is substantially negligible compared to its moment of inertia about the suspension axis or the Y-axis, and that its center of spin is outside the physical confines of the pendulum, a Z-axis being defined as the axis passing the center of gravity of the pendulum and intersecting the suspension axis at right angles and the Y-axis being defined as the axis passing through the point of intersection between the suspension axis and the Z-axis and being perpendicular to both these axes.

7. The method of construction of a pendulous accelerometer for the measurement of linear acceleration along a sensitivity axis in which a rigid pendulum is pivoted for rotation about a suspension axis which is substantially perpendicular to the sensitivity axis, the improvement in the pendulum comprising the step of shaping the pendulum to have its center of gravity located along a Z-axis and of making its thickness a direction normal to the plane defined by the suspension axis and the Z-axis as is consistent with the required structural integrity of the pendulum, the Z-axis being defined as the axis intersecting the suspension axis at right angles and being perpendicular to the sensitivity axis.

8. The combination of a vehicular body and a pendulous accelerometer mounted in the body, at a point distant from the center of mass of the body, for measuring the linear acceleration of the body, along a selected body axis, said combination being insensitive to and independent of angular acceleration and angular velocity of the body about any body axis passing through the center of mass of the body, the pendulous accelerometer of said combination comprising: a pendulous mass and a pivot means for pivoting said pendulous mass about a pivot axis disposed at right angles to said selected body axis and at right angles to and intersecting with a pendulum axis, said pendulum axis being defined as the axis passing through the center of mass of said body and the center of mass of said pendulous mass, the pendulous mass being shaped such that its center of percussion and its center of spin substantially coincide with the center of mass of said body.

9. The combination of a vehicular body and a pendulous accelerometer mounted in the body, at a point distant from the center of mass of the body, for measuring the linear acceleration of the body along a selected body axis, said combination being insensitive to and independent of angular acceleration and angular velocity of the body about any body axis passing through the center of mass of the body, the pendulous accelerometer of said combination comprising: a pendulous mass and a pivot means for pivoting said pendulous mass about a pivot axis disposed at right angles to said selected body axis and at right angles to and intersecting with a pendulum axis, said pendulum axis being defined as the axis passing through the center of mass of said body and the center of mass of said pendulous mass, the pendulous mass being shaped such that its center of percussion overlies the center of mass of said body and that the difference between its moment of inertia about the pendulum axis and about an axis at right angles to and intersecting said pendulum axis and said pivot axes at a common point is substantially equal to the mass of said pendulous mass multiplied by the product of the distance from said pivot axis to the center of mass of the pendulous mass and to the center of mass of said body.

10. The combination of a vehicular body and a pendulous accelerometer mounted in the body, at a point distant from the center of mass of the body, for measuring the linear acceleration of the body along a selected body axis, said combination being insensitive to and independent of angular acceleration and angular velocity of the body about any body axis passing through the center of mass of the body, the pendulous accelerometer of said combination comprising: a pendulous mass and a pivot means for pivoting said pendulous mass about a pivot axis disposed at right angles to said selected body axis and at right angles to and intersecting with a pendulum axis, said pendulum axis being defined as the axis passing through the center of mass of said body and the center of mass of said pendulous mass, the pendulous mass being shaped such that its thickness in the direction of the selected body axis is as small as is consistent with structural rigidity and that it center of percussion coincides with the center of mass of said body.

11. A method of measuring the linear acceleration of a vehicular body along a selected body axis which method is insensitive to and independent of the angular acceleration and of the angular velocity of the body about any body axis passing through the center of mass of the body, said method comprising the steps of:
shaping and pivoting the pendulous mass of a pendulous accelerometer to have substantially coincident centers of percussion and spin;
mounting the pendulous mass on the body for pivotal motion about a pivot axis which is at right angles to said selected body axis and which is positioned such that the center of spin of the pendulous mass substantially overlies the center of mass of the body; and
measuring the force necessary to maintain the direction of extension of the pendulous mass substantially perpendicular to the selected body axis.

12. A method of measuring the linear acceleration of a vehicular body along a selected body axis which method is insensitive to and independent of the angular acceleration and of the angular velocity of the body about any body axis passing through the center of mass of the body, said method comprising the steps of:
shaping and pivoting the pendulous mass of a pendulous accelerometer such that its moment of inertia about a Y-axis is substantially equal to the sum of the moments of inertia about the pendulous mass pivot and a Z-axis, where the pivot axis, the Y-axis and the Z-axis have a common point of intersection and are orthogonal, and the Z-axis passes through the center of mass of the pendulous mass;
mounting the pendulous mass on the body for pivotal motion about the pivot axis such that the Y-axis is substantially parallel to said selected body axis and positioning the pendulous mass such that the center of spin of the pendulous mass substantially overlies the center of mass of the body; and
measuring the force necessary to maintain the direction of the Y-axis of the pendulous mass parallel to the selected body axis.

13. A method of measuring the linear acceleration of a vehicular body along a selected axis which method is insensitive to and independent of the angular acceleration and of the angular velocity of the body about any body axis passing through the center of mass of the body, said method comprising the steps of:
dimensioning the thickness of the pendulous mass of a pendulous accelerometer in the direction at right angles to a pivot axis to be as small as consistent with structural rigidity;
mounting the pendulous mass on the body for pivotal motion about the pivot axis which is at right angles to said selected body axis and positioning the pendulous mass such that its center of spin substantially overlies the center of mass of the body; and
measuring the force necessary to maintain the direction of extension of the pendulous mass substantially perpendicular to the selected body axis.

References Cited

UNITED STATES PATENTS

| | | | |
|---|---|---|---|
| 3,146,057 | 8/1964 | Rona | 346—108 |
| Re. 22,409 | 12/1943 | Lyman et al. | 73—517 |
| 2,598,552 | 5/1952 | Jansen | 33—172 |
| 3,339,419 | 9/1967 | Wilcox | 73—517 |

FOREIGN PATENTS

| | | | |
|---|---|---|---|
| 972,826 | 10/1964 | Great Britain | 73—514 |

JAMES J. GILL, Primary Examiner

H. GOLDSTEIN, Assistant Examiner